Figure 1:
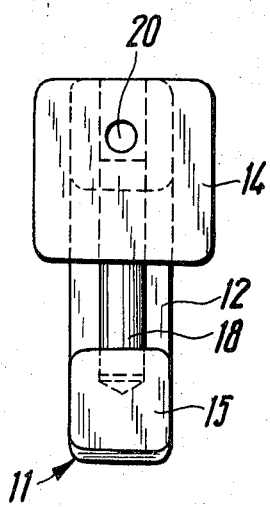

United States Patent [19]
Rieger et al.

[11] 3,835,908
[45] Sept. 17, 1974

[54] LINK ELEMENT FOR CHAINS

[76] Inventors: Hansjorg Rieger, Langerstrasse 90, 708 Aalen, Wurttemberg; Erhard Alfred Weidler, Jahnstrasse 32, 7084 Unterkochen/Wurttemberg, Germany

[22] Filed: Feb. 13, 1973

[21] Appl. No.: 332,070

[30] Foreign Application Priority Data
Feb. 18, 1972   Germany.................... 22 08 509

[52] U.S. Cl. .............................................. 152/243
[51] Int. Cl. ........................................... B60c 27/06
[58] Field of Search .......... 152/241, 242, 243, 244, 152/245, 213, 233

[56] References Cited
UNITED STATES PATENTS
3,559,713   2/1971   Muller ............................... 152/243
3,603,371   9/1971   Muller ............................... 152/243
3,614,971   10/1971  Muller ............................... 152/243

*Primary Examiner*—James B. Marbert

[57] ABSTRACT

The invention relates to a link element for chains, in particular tire chains, consisting of an open substantially C-shaped body member, of which the sections, defining an insert slot for the joining elements of chain strands to be coupled together, form aligned openings for receiving a locking element for bridging the insert slot.

4 Claims, 3 Drawing Figures

PATENTED SEP 17 1974

3,835,908

LINK ELEMENT FOR CHAINS

A link element of the above-mentioned type, formed as a chain lock, is known, in which element the aligned receiving openings are formed by through holes, and in which the locking element consists of a tie rod, which is either screwed into the receiving openings or is rivetted at its ends extending out of the receiving openings (German patent publication 1,922,149). The known link element has a number of functional advantages, however under unfavourable conditions its assembly or disassembly is complicated.

The object of the invention is to provide a link element of the type described initially, which can be opened and locked in a particularly simple and easy manner. This object is obtained in accordance with the invention thereby that one of the receiving holes is formed by a blind hole, and, for locking the locking element in the locking position, a securing pin is provided insertable into a transverse bore, which crosses the through hole.

The link element in accordance with the invention, offers the advantage that the locking function and the securing function are performed by different members. The locking element thus can be passed relatively simply into the locking position, in which a slipping out of the joining elements, which are to be coupled into a chain strand, already is impossible. Thereafter the securing pin is driven into the transverse bore provided for it. Because the securing pin may have relatively small dimensions, the forces required for driving it in are similarly small.

It is of particular advantage if the transverse bore, extending in the plane of the body member, is open at both ends and has a length which is at least equal to double the length of the securing pin. Such a construction offers the advantage that the securing pin can be introduced into the transverse bore from the end of the connecting element, which can be reached more easily, and that, for dis-assembly, it merely has to be moved for a determined length along the transverse bore.

The invention is described in more detail hereafter by way of an example of an embodiment illustrated in the attached drawing.

Figure 2:
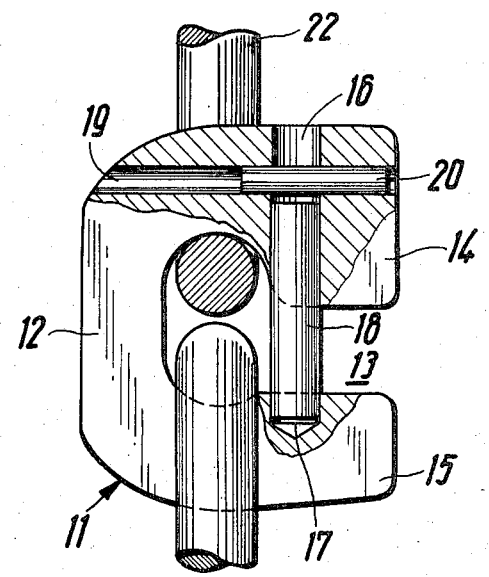
Figure 3:
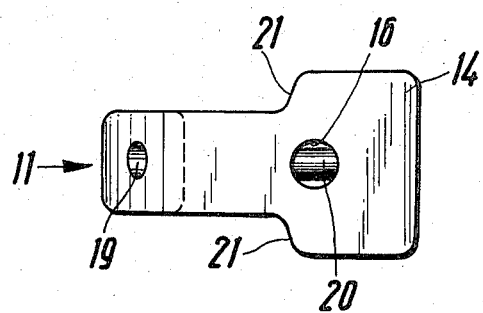

It is shown in:

FIG. 1 the plan view on a link element according to the invention;

FIG. 2 partially in section, the side view of the link element according to FIG. 1, and FIG. 3 the front view of the link element according to FIGS. 1 and 2.

In the FIG. 11 is the body member of the link element in accordance with the invention, which has a longitudinal leg 12 and two sections 14 and 15 defining an insert slot 13.

In the section 14 a through hole 16 is provided parallel to the leg 12, which hole is in alignment with a blind hole 17 in section 15. The through hole 16 and the blind hole 17 form openings for receiving a bolt-type locking element 18.

The locking element 18 is kept in the locking position by means of two stops. One of the stop is formed by the floor of the blind hole 17 and the other is formed by a securing pin 20 driven into a transverse bore 19. The securing pin 20, which can be forced in perpendicularly to the longitudinal leg 12 of the connecting element, can have a very small diameter. Not only does this offer the advantage that it may be driven easily into the transverse bore 19, but also in addition it has the advantage that the cross-section of the part of the body member 11 joining the longitudinal leg 12 to the section 14, is weakened only to a small extent. Due to the reason that the locking element is not situated in a stressed zone of the body member, its diameter may be large so that a secure locking is ensured.

For opening the locking element, the securing pin 20 is merely driven further into the transverse bore 19 for a distance until it is clear of the region of the through hole 16. Subsequently the locking element, which is guided with play in its receiving openings, can be removed easily out of its position bridging the insert slot 13.

The section 14 of the body member 11 is of a dimension greater than the section 15. Its sidewardly extending shoulders 21 form stops, which prevent a loose suspension of the joining element 22, which is allocated to the section 14 and which forms part of a chain strand to be linked together.

What is claimed is:

1. A connecting link for joining adjacent links of a tire chain comprising a generally C-shaped body having transversely extending leg portions, said leg portions being spaced apart to provide for insertion and accommodation of coupled chain strands, a first bore extending through one of said leg portions aligned with a recess in the other of said leg portions whereby locking pin means is insertable therein, and a second bore in one of said leg portions extending transversely thereof and intersecting said first bore, and securing pin means insertable in said second bore for retaining said locking pin means in chain strand locking position.

2. A connecting link according to claim 1 wherein said leg portion having said first and second bores is of greater dimension than said other leg portion.

3. A connecting link according to claim 1 wherein said locking pin means is of lesser length than said second bore so as to be seatable therein.

4. A connecting link according to claim 1 wherein said locking pin means is a cylindrical bolt and is slidingly fitted in said first bore and said recess.

* * * * *